UNITED STATES PATENT OFFICE.

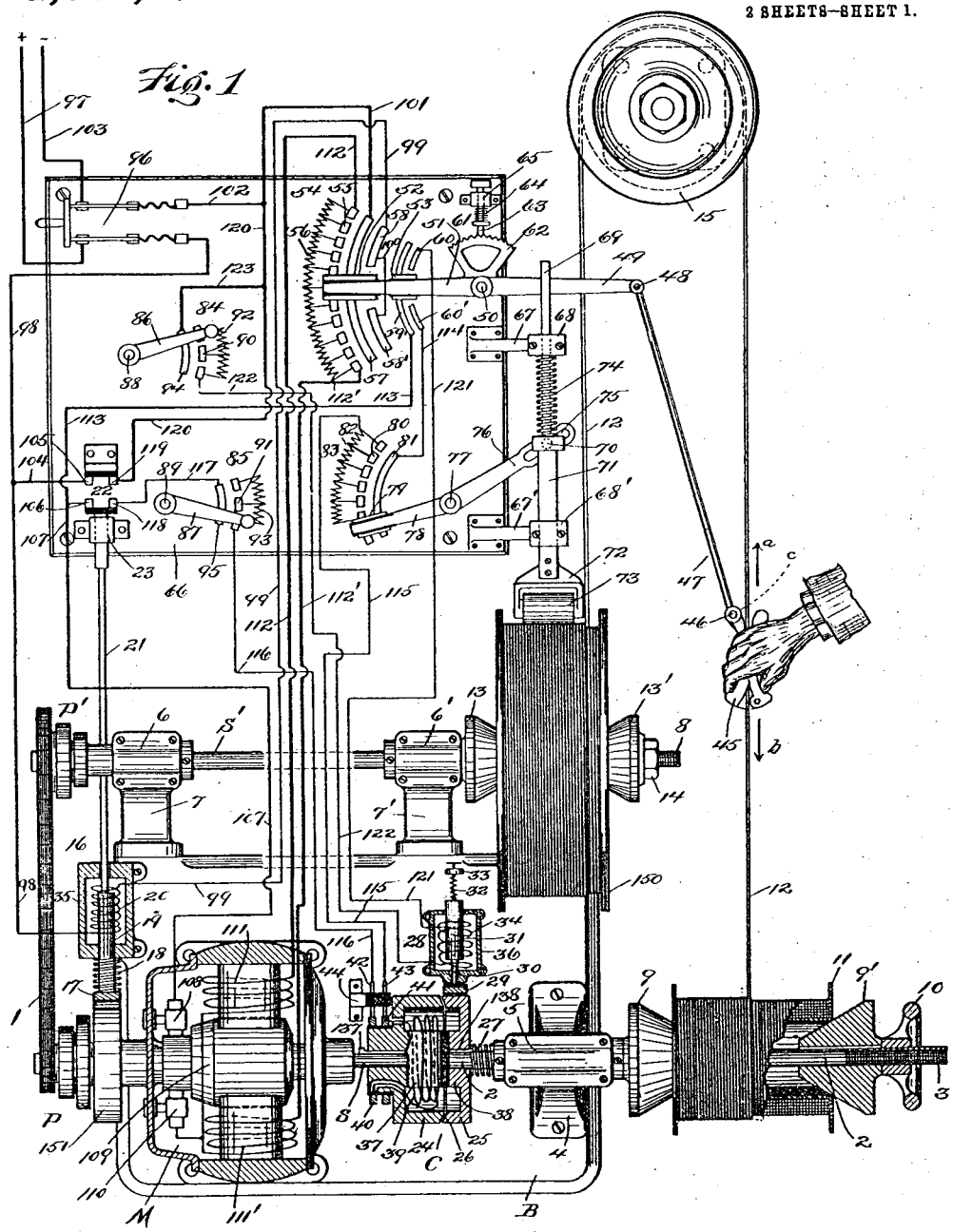

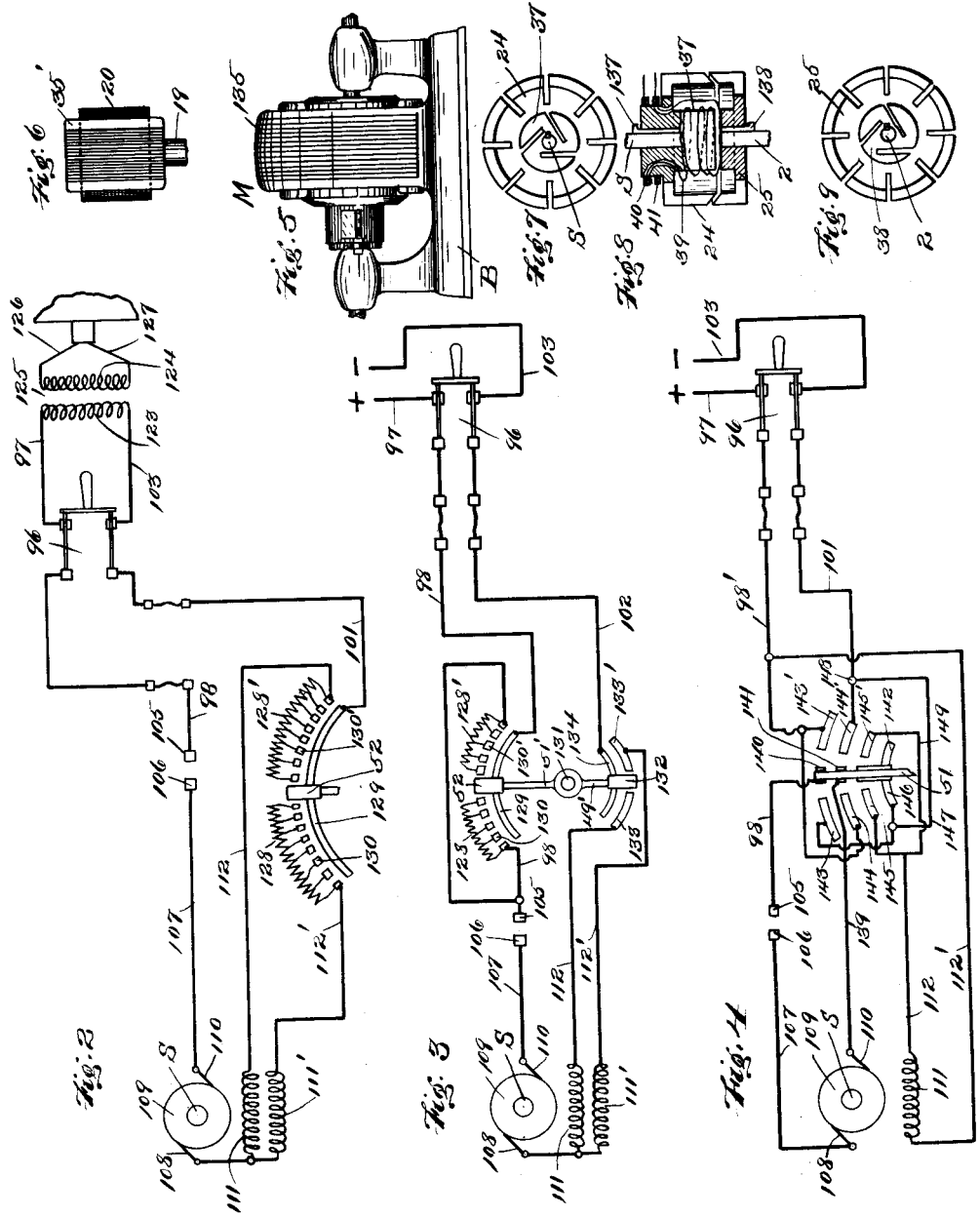

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

MEANS FOR WINDING ELECTROMAGNETS.

1,066,676.     Specification of Letters Patent.     Patented July 8, 1913.

Application filed April 28, 1906. Serial No. 314,225.

*To all whom it may concern:*

Be it known that I, AUGUST SUNDH, a citizen of the United States, residing at Yonkers, in the county of Westchester and State of New York, have invented a new and useful Improvement in Means for Winding Electromagnets, of which the following is a specification.

My invention relates to spool winding machines, and one of its objects is the provision of controlling apparatus for a spool winding machine to effect the winding of insulated wire, bare wire, thread, or the like, without breaking the latter or exerting any undue strain on the same.

A further object of the present invention is the provision of controlling apparatus for spool winding machines to permit the latter to be reversed without causing the wire to become slackened.

Another object of the invention is to provide automatic means for winding the wire on one spool at substantially the same rate of speed as it is given out by the other spool.

A further object of this invention is to provide means for adjusting the speed of spool winding machines for different kinds of spools.

Another object of the invention is to provide means whereby a spool winding machine can be reversed and the wire unwound from one spool and wound back on it without subjecting such wire to undue strain, but at the same time keeping said wire sufficiently taut.

Broadly it is the object of the present invention to provide an automatic control for spool winding machines to enable persons without skill to effect the winding of spools with accuracy and in a short space of time.

Other objects of my invention will appear hereinafter, the novel combination of elements being pointed out in the claims.

In the accompanying drawings, Figure 1 illustrates a spool winding machine combined with a controlling apparatus, said combination embodying my invention; Figs. 2, 3 and 4 illustrate modifications for reversing and controlling the speed of the electric driving motor; Fig. 5 illustrates a type of motor which may be used when alternating current is employed; Fig. 6 illustrates an alternating current electric brake magnet; and Figs. 7, 8 and 9 illustrate how the magnetic clutch may be modified so as to adapt the same to alternating current.

Referring to Fig. 1, B designates a bed plate on which is suitably mounted the motor M and a standard 4, for supporting the bearing 5 through which passes the auxiliary shaft 2. S designates the motor shaft, to one end of which is connected the clutch C, and to the other end of which is connected the variable speed pulley P. A belt 1 connects the pulley P with an additional variable speed pulley P'. The auxiliary shaft 2 is screw-threaded at 3 at its outer end, on which is adapted to turn, the nut 10. A cone 9 is secured to the shaft 2 to the right of the bearing 5, as viewed in Fig. 1, and on the outer end of the shaft is mounted an additional cone 9', so as to have longitudinal movement but no circumferential movement with respect to the shaft 2. The spool on which the wire is to be wound is placed between the cones 9 and 9', and the nut 10 then turned to connect said spool 11 rigidly to the shaft 2 so as to turn therewith. A counter-shaft S' is mounted in bearings 6, 6' respectively, on supports 7, 7'. The pulley P' is connected to one end of this shaft S' while a cone 13 is fixed to its other end to the right of the bearing 6'. The spool or drum 150 from which the wire is to be wound, is secured between the cone 13 and a similar cone 13', by means of the nut 14 acting on the threaded outer end 8 of the counter-shaft S'. The cone 13' may be connected to the shaft S' in the same manner as the cone 9' is connected to the shaft 2. 16 designates the electro-magnetic brake apparatus comprising a brake shoe 17, to coöperate with the brake pulley 151. Between the brake shoe 17 and the frame 35 is connected the brake spring 18. The brake shoe 17 is connected to move with the core 19 which is adapted to play in the solenoid 20, while a rod 21 connects said core with the movable contacts of the switch 22, which is shown on the controller board 66. If desired, a guide 23 may be provided for the rod 21 to insure its movement in the proper direction so that the insulated contacts 106 and 118 will engage the fixed contacts 105 and 119, respectively.

The clutch C comprises two magnetic members, 24 and 25, which are respectively the polar member and the armature member. The winding is placed on the internal pole 37 and its terminals connected to slip rings 40 and 41, which are insulated from each other. The cup-shaped pole of the member 24 is beveled at its periphery at 26, as also is the cup-shaped portion of the armature 25 opposite the same. An interior projection 38 of the armature 25 is disposed in alinement with the pole 37. The polar member 24 is fixed to the shaft S by means of a key 137, while the armature member 25 has a sliding movement on the auxiliary shaft 2 by reason of the key 138. A spring 27 tends to move the armature 25 into engagement with the polar member 24, and if desired, the beveled surfaces 26 may be lubricated with graphite so as to prevent sticking. A bracket 44 carries insulated brushes 42 and 43 which engage the slip rings 40 and 41, respectively. A brake 28 is associated with the periphery of the armature 25. A spring 32 connecting the bracket 33 and the core 31, normally lifts the latter to hold the brake-shoe 29 out of engagement with the armature 25, the brake-shoe 29 being connected by the stem 30 to the core 31. Within the frame 36 is placed the solenoid 34 through which the core or plunger 31 moves.

Manual rheostats 84 and 85 are connected to respectively control the electro-magnets of the brake 28 and the clutch C. It will be noticed that the plunger or core 31 is so disposed with relation to the solenoid 34, that when the latter is excited with current, the brake-shoe 29 is positively applied to the cylindrical peripheral surface of the armature 25. By moving the switch arm 86, which is pivoted at 88, over the contacts 90 and the contact segment 94, a portion of the resistance 92 will be cut out from in circuit with the solenoid 34, and consequently more current will be received by the latter to increase the braking action of the shoe 29. When the switch arm 87 which is pivoted at 89, is moved over the contacts 91 and the contact segment 95, some of the resistance 93 will be inserted in circuit with the clutch magnet winding 39 and thus decrease the magnetic attraction between the polar member 24 and the armature 25.

54 designates a rheostat, which in this instance is connected to the motor field windings so as to control the speed of the motor and direction of rotation thereof. The switch arm 51 for operating this rheostat is pivoted at 50 and a notched segment 62 is connected to said lever at its pivotal point. A detent 63 movable in the guide 65 is forced by the spring 64 into one of the notches of the segment 62 so as to hold the switch arm in adjusted position. The notches of this holding device 61 are so shaped that with comparatively little turning force exerted on the arm 49 at 48, the arm 51 may be turned and the detent 63 lifted each time it passes out of one notch to go to the next.

A guide 45 which is adapted to be grasped by a person's hand and through which the wire 12 passes, is pivoted at 46 to the link 47 which in turn is pivoted at 48 to the arm 49 of the rheostat 54. That is, the arm 49 is pivoted at 50 so as to move with the stitch arm 51 and the segment 62. The wire on the reel or drum 150 is first passed around the guiding sheave 15, and thence in a straight line through the guide 45 to the spool 11 on which said wire is wound. It is evident that if the speeds of rotation of the reel and spool are kept constant, the wire 12 would not be maintained taut. It should be noted that at the start, the diameter of the first layer of wire on the spool 11 is much less than the diameter of the outside layer of the reel 150. In order to keep the wire taut, however, the peripheral speed of the spool 11 with respect to the first layer, should be the same as the peripheral speed of the outside layer of the reel 150 so that the spool 11 would wind up the wire as fast as it is paid out by the reel 150, and yet a certain tension in the wire 12 should be maintained so that the latter would be wound securely in place on the spool 11. I, therefore, provide controlling apparatus which will effect such a slipping between the members of the clutch C that the wire 12 will be wound on the spool 11 as fast as it is paid out by the reel 150, and at the same time the wire 12 kept sufficiently taut to insure the layers being wound evenly and in close proximity without undue strain on said wire. This I accomplish by providing automatic means for operating the rheostat 83 to control the energization of the clutch magnet 39. This automatic device comprises brackets 67, 67' secured to the controller board 66 if desired. At the outer ends of these brackets are slide bearings 68, 68', through which pass respectively, the rods 69 and 71. To the lower end of the rod 71, as viewed in Fig. 1, is connected a bracket 72, in which is pivoted the roller 73, the latter being in engagement at all times with the outside layer of the wire on the reel 150. Gravity may be depended upon to maintain the roller 73 in contact with the outside layer of the reel 150, but I prefer to place a spring 74 between the bearings 68 and the upper end of the rod 71 so as to encircle the rod 69. In such case the rods 69 and 71 may be placed in any other position than vertical, for example, horizontal.

The rheostat 83 comprises sectional resistance 82 connected to the contacts 80. Over these contacts and the contact segment 81, is adapted to move the bridge piece 79 insulated from but connected to the switch arm 78 which is herein shown as pivoted at 77 to the controller board 66. Connected to the arm 78 so as to move therewith, is the lever arm 76 provided with a slot 75 at its outer end. In this slot plays a pin 70 laterally projecting from the upper end of the rod 71 so that as the reel is unwound and the roller 73 is moved inwardly toward the core of said reel, the lever 76 will be gradually rotated and consequently, the bridge piece 79 moved over the contacts 80 and the contact segment 81 to gradually cut out sections of the resistance 82 in circuit with the electro-magnet winding 39. This will have the effect of increasing the magnetic attraction of the clutch members for each other and consequently increasing the turning power or torque applied to the shaft 2 as is evidently necessary in order to prevent a decrease in the tension on the wire 12 as the diameter of the windings on the spool 11 increases.

Having thus described the essential elements of a construction which illustrates the application of my invention, the operation thereof will now be explained. Assuming the parts to be in the positions shown in Fig. 1 and the wire 12 drawn from the reel 150 around the guiding sheave 15 and fastened or suitably connected to the core of the spool 11, the cone 9' may be turned manually to draw said wire sufficiently taut to take all the slack out of the same. The wire 12 may first be passed through the holder 45, or the holder 45 placed over the same and then grasped by the hand, as shown. The arm 51 still being in central position, all the parts will remain stationary, but as soon as the guide 45 is moved in the direction of the arrow a the bridge piece 52 will be moved into engagement with the segment 58'. When this occurs a circuit will be established from the positive main, through wire 97, one blade of the main line switch 96, wire 98, solenoid 20 of the main brake apparatus 16, wire 99, and thence to the segment 58'. From here the circuit continues through the bridge piece 52, segment 57, wires 101 and 102, the other blade of the switch 96, wire 103, and finally to the negative main. The core 19 together with the brake shoe 17 will thereupon be lifted against the action of the spring 18. This action effects the closure of the switch 22 by reason of the rod 21 being connected to the core 19 and carrying the contacts 106 and 118. The switch 22 controls the motor circuit and it will therefore be seen that the main brake will be released a short space of time before the motor will receive current. Upon the closure of the switch 22, the motor circuit may be traced as follows: from the positive main through wire 97, switch 96, and wires 98 and 104 to the contacts 105 and 106. Thence the circuit continues through wire 107 to the armature brush 108, armature 109, brush 110, and through the field windings 111 and 111' in parallel. This parallel circuit continues through the wires 112 and 112' to the outside terminals of the contacts 55 which are connected to the sectional resistance 56. The current flowing through this parallel circuit meets at the bridge piece 52 flowing through the same to the segment 57, and thence by way of wires 101 and 102 to the switch 96 and wire 103 out to the negative main. When the electric switch 22 is closed, a circuit will also be established from the positive main through wires 97, switch 96, and wires 98 and 104, to and through contacts 105, 106, wire 113, segment 59', bridge piece 53, segment 60', wire 114, segment 81, bridge piece 79, one or more of the contacts 80, resistance 82, wire 115, brush 43, slip ring 41, windings 39 of the clutch C, slip ring 40, brush 42, wire 116, rheostat 85, wire 117, contacts 118, 119, wires 120, 102, and thence through the switch 96 and the wire 103 to the negative main. The clutch C will thereupon become magnetized to firmly hold the armature 25 in engagement with the polar member 24 so that when the motor begins to rotate, the spool 11 will also be turned. It should be noted that the variable speed pulley P is so connected by the belt 1 to the variable speed pulley P' that the spool 11 will be rotated much faster than the reel 150. Obviously the shaft S may be so belted or geared to the counter-shaft S' that any desired ratio of speed between the spool 11 and the reel 150 may be obtained. As before stated, it is desired to keep the wire 12 sufficiently taut at all times to insure the wire being wound on the spool in even layers close together, or as compactly as possible. At the same time there should be no undue strain exerted on the wire 12 when the spool 11 winds the same on itself and the reel 150 at the same time pays out said wire at a corresponding speed. It is preferable to so connect the spool 11 with the reel 150 through the clutch C, motor M, pulleys, etc., that said spool tends to wind the wire 12 or move the same through the guide 45 at a greater speed than it is paid out by the reel 150.

It will be noticed that when the winding apparatus is first started, the energization of the clutch C is a minimum, and therefore, the tendency to slipping between the polar member and the armature member is a maximum. The spring 27, in addition to moving the armature member 25 into engagement with the polar member 24, may also act as a winding spring to a certain extent, but in such case the key 138 will be omitted and the ends of such spring connected to a shaft 2 and the armature 25, respectively. In the present instance, however, inasmuch as the key 138 prevents any rotation of the armature 25 on the shaft 2, any motion imparted to such armature by the polar member 24 will be transmitted directly to the spool 11. While the reel 150 is full of wire, as shown in Fig. 1, the spool 11 can be rotated positively with respect to said reel 150, and the wire 12 kept taut for some time without exerting undue strain thereon. But since the spool 11 is so connected to the reel 150 by the shafts and other mechanism, as described, that the tension on the wire 12 will be gradually increased, a point will be reached when this tension will cause a slipping between the polar member and the armature 25, this slipping preventing too great a strain on the wire 12. As the layers of wire on the reel 150 decrease, the spring 74 will be permitted to move the pin 70 against the arm 76 which in turn will move the bridge piece 79 over the contacts 80 to cut out gradually the sectional resistance 82 in circuit with the clutch magnet winding 39. The spool 11 and reel 150 will continue to be driven by the shafts S and S' respectively but it will be seen that as the layers are added to the spool 11, the diameters of such layers gradually increase and at the same time the diameters of the layers on the spool 150 are decreased. The angular velocity of the spool 11 relative to the reel 150 is therefore decreased, and the amount of slipping between the clutch members 24 and 26, increased. The tension, however, on the wire 12, required to cause the slipping, tends to decrease as the winding decreases owing to the increasing diameter of the material on the spool 11. This tendency of the tension to decrease is compensated for by the automatic cutting out of the sectional resistance 82 as has been explained. The ultimate effect is to maintain the tension on the wire 12 substantially constant during the entire winding of the spool 11. In order to still further adjust the action of the clutch C, I have placed a manual rheostat 85 in circuit with the clutch magnet winding 39. Obviously the strength of the clutch C may be varied by moving the switch arm 87 over the contacts 91 to insert or cut out the resistance 93. Furthermore, the rheostat 83 may be operated oppositely to that shown so as to gradually decrease the strength of the magnetic clutch C as the diameter of the outside layers on the spool 11 increases. If, however, the back pull on the wire 12 at the reel 150, remains substantially the same throughout the winding operation, it will be seen that the tension on the wire 12 will remain substantially the same if the torque on the shaft 2 and its speed is kept constant. It is only by reason of the varying diameters of the outside layers on the reel and on the spool, that the tension on the wire 12 tends to be varied, and therefore, it is preferable to vary the strength of the magnetic clutch accordingly. In other words, the apparatus should be so designed that during the entire operation the wire 12 should be wound on the spool 11 at substantially the same speed, and the tension on said wire maintained within a narrow range of variation.

If desired, any well known guiding device for the wire 12 may be used in conjunction with the spool 11 so that the skill of the operator need not be depended upon to guide the wire 12 to wind the same in even and compact layers. With such guiding apparatus there could be used a stop motion and reversing device so as to cause the wire to be wound to form a new layer.

In case it is desired for any reason whatever to unwind the wire from the spool 11 back on to the reel 150, as for example, when one winding is accidentally placed on top of another, or if the layer is not being evenly wound, the guide 45 may be moved in the direction of the arrow $b$ to move the arm 51 to central position. In such event the circuit for the brake magnet 20 is broken at the contact segment 58' and the brake shoe 17 will consequently be applied to the motor brake pulley 151, tending to stop the motor and the parts connected thereto. Furthermore, when this brake is applied, the switch 22 will be opened and the clutch C therefore, deënergized. The tendency would therefore be for the spool 11 to continue its motion and then rotate in the opposite direction, slackening the wire 12 and unreeling and loosening several of the windings thereon. To obviate this difficulty, the guide 45 should be moved so as to bring the arm 51 past its central position so as to connect the segment 60 to the segment 59', and at the same time moving the bridge piece 52 into engagement with the segment 58. A circuit will then again be closed through the main brake magnet to release the brake shoe 17 and close the switch 22. Thereupon the motor M will start to rotate in the opposite direction, and at the same time the brake apparatus 28 will be operated. The circuit for the solenoid 34 of the clutch brake 28 may be traced from the positive main through wire 97 and switch 96 by way of wires 98 and 104 to and through contacts 105, 106, wire 113, segment 59', bridge piece 53, segment 60, wire 121, solenoid 34, wire 122, resistance 92, contacts 90, switch arm 86, segment 94, wires 123, 120, 102, and thence through the other blade of the switch 96 and wire 103 to the negative main. When this circuit is thus completed, the core 31 will be drawn downwardly to apply the brake shoe 29 to the cylindrical surface of the arm 25 against the action of the spring 32, which restores the brake shoe 29 to its normal position when said circuit is interrupted. The strength of the clutch brake may be varied by means of the manual rheostat 84 in an obvious manner.

The effect of the brake device 28 is to cause a certain tension to be placed on the wire 12 so as to keep it taut and prevent the windings from becoming loosened on the spool 11. As the motor rotates in the opposite direction, as explained, the reel 150 will be rotated so as to wind the wire 12 back onto the same from the spool 11 against the retardation due to the brake shoe 29 being applied to the peripheral surface of the armature 25.

After a sufficient number of windings have been unwound from the spool 11 so as to cure the defect in the first winding, the operator may again move the guide 45 in the direction of the arrow $a$ to release the brake shoe 29 and reverse the direction of rotation of the motor M, and consequently also of the reel 150 and the spool 11. That is, when the arm 51 is moved in the opposite direction, or to the position which was first assumed, the winding machine will resume its normal operation and the clutch C again energize to transmit the requisite torque to the shaft 2 to effect the proper winding of the wire 12 on the spool 11.

Preferably the segments 60 and 60′ extend inwardly toward the central position of the arm 51 farther than do the segments 58 and 58′, so that when the arm 51 is moved in either direction, the segments 60 and 60′ will be brought into engagement with the bridge piece 53 before the segments 58, 58′ contact with the bridge piece 52. This is particularly true with respect to the segment 60 which is connected to the brake apparatus 28, so that whenever it is desired to stop entirely the operation of the winding machine, the arm 51 may be brought back to central position to effect the application of the main brake 16, and then moved a short distance farther to bring the bridge piece 53 into engagement with the segment 60 to effect the application of the brake shoe 29 to the armature 25, thus holding the spool 11 to prevent the same from unwinding the wire already wound thereon. In such case, however, the brake magnet of the clutch brake 28 should not depend upon the switch 22, but be connected directly across the mains. This may be accomplished by connecting the wire 113 to the wire 98 instead of to the wire 107 as shown in Fig. 1.

The electric motor M shown in Fig. 1 comprises two windings connected in parallel and so wound as to produce similar poles. When the bridge piece 52 is in central position, as shown, an equal amount of resistance is connected between such bridge piece and each winding, 111, and 111′. When, however, the guide 45 is moved in the direction of the arrow $a$, some resistance is cut out from one field winding and inserted in the other, thus resulting in a weakening of one field and a strengthening of the other. If all the resistance is inserted in circuit with one of the windings, it is evident that this resistance may be so great that the other winding will produce a strong pole adjacent the same and a consequent pole on the opposite side. By varying the resistances inserted in circuit with the field windings, the torque and speed of the motor may be varied at will. I do not, however, wish to be limited to any particular motor or any speed controlling device therefor.

Instead of varying the strength of the poles of a motor, there may be two field windings, as shown in Fig. 2, and resistance inserted in circuit with one or the other. By reference to Fig. 2 it will be seen that I have provided in this instance a series motor having two windings 111 and 111′ oppositely wound, so that if the current goes through one field, the motor will turn in one direction, and if the current goes through the other field, the motor will be reversed. But in this instance, after one field is connected in circuit, the other is entirely cut out. Therefore, if the guide 45 is moved in the direction of the arrow $a$, the field 111′ will be connected in circuit with the resistance 128, and by moving the bridge piece 52 over the contacts 130 and segment 129, the speed of the motor may be varied as desired. If a switch arm 51 is moved in the opposite direction, the field 111 and the resistance 128′ will be connected in circuit, and the motor therefore, rotated in the opposite direction.

It will be apparent that both direct and alternating current may be used to operate the controlling and driving apparatus for the spool winding machine, or pulsating or intermittent current may be used if desired. In Fig. 2 I have illustrated a source of single phase current in that the leads or means 126, 127 are connected to the primary 124 of a transformer 125, the secondary 123 of which is connected to a series alternating current motor. In such case the element which is to be varied to control the speed and torque of the motor, may include inductive resistance as well as ohmic resistance. In designing the apparatus for alternating current, the cores of the electro-magnets as well as the field and armature of the motor, should be laminated. In Fig. 6 I have illustrated the frame 35′ of the main brake magnet as laminated and the single phase electro-magnet 20 within the same. Fig. 5 illustrates how the field 135 of the motor M may be laminated in case alternating or pulsating current is employed for the operation and control of the spool winding machine. Instead of laminating the clutch device C, it may be provided with slots as indicated in Figs. 7, 8 and 9.

Fig. 3 illustrates a modification of Fig. 2 and shows how the resistances 128 and 128′ may be directly connected to the armature 109 at the same time that the winding 111 or 111′ is connected in circuit. The effect, however, would be the same as the construction shown in Fig. 2.

Fig. 4 shows a series motor with a single winding 111 and a reversing switch for reversing the current through the armature alone when the position of the armature 51 is reversed. If desired, sectional resistance may also be used in connection with this reversing device to vary the speed of the motor. This is obvious from Fig. 3 where a reversing device is shown at one end of the arm 49′, and a variable rheostat at the outer end of the arm 51′. In a similar manner an arm could be connected to the arm 51 of Fig. 4, so that the first-named arm would control either one section or the other of a double rheostat placed in the wire 112′ of Fig. 4, as the double rheostat of Fig. 3 is placed in the wire 98. If it be assumed that the arm 51 is moved to the right in Fig. 4, a circuit may be traced from the positive main, through wire 97, switch 96, wire 98′, wire 112′, shunt winding 111, wires 112, 149, segment 145′, bridge piece 142, segment 146, wire 147, to the point 148, and thence by wire 101, switch 96, and wire 103 to the negative main. The circuit through the armature extends from wire 98′ through the segment 143′, contact 140, wire 98, contacts 105, 106, wire 107, armature 109, wire 139, contact 141, segment 144′, to the point 148.

Without limiting myself to the details of construction and arrangement of parts disclosed, what I claim as new and desire to secure by Letters Patent of the United States is:—

1. In a winding machine, the combination with winding apparatus and unwinding apparatus, of a motor for simultaneously driving said apparatuses, a variable rheostat for controlling the speed of said motor, and a reversing switch co-acting with said variable rheostat to start, stop or reverse said motor.

2. In a winding machine, the combination with spool winding mechanism, of an electric motor connected to drive said winding mechanism, and a combined rheostat and reversing switch for controlling the starting, stopping, speed, and direction of rotation of said motor.

3. In a winding machine, the combination with a shaft, of means carried by said shaft for receiving the material to be wound, a motor for rotating said shaft and receiving means, a counter-shaft, a reel mounted on said counter-shaft and carrying the material to be wound on said receiving means, and speed reducing connections between said shafts through the motor shaft.

4. In a winding machine, the combination with winding mechanism and unwinding mechanism, of a motor for simultaneously driving said mechanisms, brake apparatus for said motor, a switch for controlling said motor, and means co-acting with said brake apparatus for actuating said switch when said brake apparatus is operated.

5. In a winding machine, the combination with winding mechanism and unwinding mechanism, of an electric motor for simultaneously driving said mechanisms, electro-magnetic brake apparatus for said motor, a main line switch for said motor, and means co-acting with said brake apparatus for closing said main line switch upon the brake being released.

6. In a winding machine, the combination with winding apparatus comprising a plurality of rotating spools, of a motor for operating said apparatus to simultaneously rotate the said spools, an electro-magnetic clutch connecting said motor to rotate one of the said spools, and means for varying the strength of said electro-magnetic clutch.

7. In a winding machine, the combination with a motor, of a spool to receive material to be wound thereon, driving mechanism between the motor and spool comprising an electro-magnetic clutch, a rheostat for varying the strength of said clutch, an automatic means to slowly operate the rheostat so as to vary the strength of the clutch to correspond with the increase in diameter of the spool and material wound thereon.

8. In a winding machine, the combination with winding mechanism comprising a spool to receive material to be wound, of a motor, a magnetic clutch for transmitting power to said winding mechanism, and an automatic rheostat for varying the strength of said clutch to correspond with the increase in diameter of said spool and the material wound thereon.

9. In a winding machine, the combination with a plurality of rotating members, of spools, one for each of said members, means for actuating said members to effect the continuous rotation of said spools, and electro-mechanical means for automatically regulating the speeds of rotation of said spools.

10. In a winding machine, the combination with a shaft, of a spool associated therewith, a motor for driving said shaft, a counter-shaft connected to said motor, a reel associated with said counter-shaft and carrying the material to be wound on said spool, and means for regulating the speeds of rotation of said first-named shaft and said counter-shaft to maintain said material taut and in substantially the same tension throughout the winding operation.

11. In a winding machine, the combination with winding mechanism, of a motor for operating said winding mechanism, a switch for controlling said motor, and manual means for directing the material to be wound and for operating said switch.

12. In a winding machine, the combination with winding mechanism comprising means for receiving the material to be wound, of an electric motor for operating said winding mechanism, a variable rheostat for controlling the speed of said motor, a reversing switch co-acting with said variable rheostat, and manual means for simultaneously directing the material onto said receiving means and operating said variable rheostat and reversing switch.

13. In a winding machine, the combination with winding mechanism comprising means for receiving the material to be wound, of unwinding mechanism comprising a reel for carrying the material to be wound on said receiving means, means for driving both the said winding mechanism and the unwinding mechanism at the same time, and apparatus for controlling said driving means to maintain the material taut without exerting undue strain thereon.

14. In a winding machine, the combination with winding mechanism, of a motor, a transmitting clutch between said motor and said winding mechanism, unwinding mechanism, and speed varying means between said motor and said unwinding mechanism.

15. In a winding machine, the combination with a motor having a shaft, of a polar member, of a magnetic clutch connected to one end of the motor shaft, an auxiliary shaft, a spool mounted to rotate with said auxiliary shaft, an armature member for said clutch and connected to one end of said auxiliary shaft, a counter-shaft to rotate therewith and carrying the material to be wound on said spool, and a speed-varying connection between the other end of said motor shaft and the counter-shaft.

16. In a winding machine, the combination with winding mechanism, of a motor, a magnetic clutch connected between said motor and winding mechanism, unwinding mechanism connected to said motor to unwind the material to be wound at a less rate of speed than it is wound, and means for varying the strength of said magnetic clutch to effect a variation of slip between its members.

17. In a winding machine, the combination with winding mechanism, of a motor, an electro-magnetic clutch comprising a polar member and an armature member connected respectively to the motor and winding mechanism, unwinding mechanism connected to said motor and operated at a less rate of speed than said winding mechanism, and means for varying the strength of said electro-magnetic clutch to effect a regulating of the tension on the material to be wound by the variation of slip between said members.

18. In a winding machine, the combination with a moving member, of a spool associated therewith, a motor, a magnetic clutch connected between said motor and moving member, and comprising a polar member and an armature member, a second moving member, a speed-varying connection between said motor and said second moving member, a reel associated with said second moving member, and carrying the material to be wound on said spool, and means for automatically varying the strength of said clutch to effect a variation of slip between its members.

19. In a winding machine, the combination with a moving member, of means for receiving the material to be wound, a motor, a magnetic clutch connected between said motor and said moving member, a reel carrying the material to be wound on said receiving means, positive connections between the motor and said reel, and means dependent upon the unwinding of the material from said reel for automatically varying the strength of said clutch.

20. In a winding machine, the combination with a motor, of an electro-magnetic clutch having one of its members connected to one end of the motor shaft, an auxiliary shaft having the other member of the said magnetic clutch connected to one end of the same, means associated with the other end of said auxiliary shaft for receiving the material to be wound, a counter-shaft, a connection between the other end of the motor shaft and said counter-shaft, a reel carrying the material to be wound on said receiving means and mounted on said counter-shaft to rotate therewith, a variable rheostat, and means dependent upon the unwinding of the material from said reel for automatically operating said rheostat to vary the strength of said electro-magnetic clutch to maintain a substantially uniform tension on the material being wound.

21. In a winding machine, the combination with a moving member, of a spool associated therewith, a motor, an electromagnetic clutch between said motor and said moving member, a second moving member, a second spool associated therewith, a connection between the motor and said second moving member, means for reversing the rotations of said spools, and a retarding device for said clutch when said spools are operated in reverse direction.

22. In a winding machine, the combination with winding mechanism, of unwinding mechanism, a motor for operating both the said winding mechanism and said unwinding mechanism at the same time, means for reversing the direction of rotation of said motor, and means for maintaining taut the material unwound from the winding mechanism and wound back onto the unwinding mechanism.

23. In a winding machine, the combination with winding mechanism, of unwinding mechanism, a motor for operating said mechanisms, means for reversing said motor, a retarding device to effect a suitable tension in the material when the motor is reversed and said material is unwound from the winding mechanism and wound back onto the unwinding mechanism, and a device co-acting with said motor-reversing means for controlling said retarding device.

24. In a winding machine, the combination with winding mechanism, of unwinding mechanism, a motor, an electro-magnetic clutch comprising a plurality of members, a connection between the motor and said unwinding mechanism, a brake for one of the members of said clutch, a reversing switch for the motor, an additional switch co-acting with said reversing switch for controlling said brake, and means for actuating said switches at will.

25. In a winding machine, the combination with winding mechanism, of unwinding mechanism, an alternating current motor and separate connections for simultaneously driving said winding mechanism and unwinding mechanism at the same or different speeds, controlling apparatus for said motor, and a source of alternating current for said motor.

26. In a winding machine, the combination with winding apparatus and unwinding apparatus, of an alternating current motor, separate connections between the motor and each apparatus for simultaneously operating both of the said apparatuses, an alternating current electro-magnetic clutch, and controlling means for said motor and clutch.

27. In a winding machine, the combination with winding mechanism, of unwinding mechanism, a motor, a connection between said motor and unwinding mechanism, an electro-magnetic clutch between the motor and said winding mechanism, a reversing device for said motor, retarding mechanism for said clutch, means co-acting with said reversing device for controlling the application of said retarding device to prevent the material from being unwound from the winding mechanism faster than it is wound back onto the unwinding mechanism, and means for controlling the strength of said retarding mechanism.

28. In a winding machine, the combination with winding mechanism and unwinding mechanism, of a motor for operating said mechanisms at the same time, a switch for controlling said motor, and a single manual device for both directing the material to be wound and for operating said switch.

In testimony whereof, I have signed my name to this specification in the presence of two subscribing witnesses.

AUGUST SUNDH.

Witnesses:
 CHARLES M. NISSEN,
 J. HALLKINSLEY.